United States Patent [19]

DeLuca et al.

[11] 4,238,721

[45] Dec. 9, 1980

[54] SYSTEM AND METHOD FOR CHARGING ELECTROCHEMICAL CELLS IN SERIES

[75] Inventors: William H. DeLuca, Naperville; Fred Hornstra, Jr, St. Charles, both of Ill.; George H. Gelb; Baruch Berman, both of Rancho Palos Verdes, Calif.; Larry W. Moede, Manhattan Beach, Calif.

[73] Assignee: The United States of America as represented by the United States Department of Energy, Washington, D.C.

[21] Appl. No.: 9,622

[22] Filed: Feb. 6, 1979

[51] Int. Cl.³ .............................................. H02J 7/08
[52] U.S. Cl. ...................................... 320/18; 320/22; 320/39
[58] Field of Search ..................... 320/15, 17, 18, 21, 320/22, 23, 39

[56] References Cited

U.S. PATENT DOCUMENTS

3,413,536  11/1968  Webb ...................................... 320/17
3,496,442   2/1970  Carlisle ................................... 320/18
3,505,584   4/1970  Ford et al. ........................... 320/39 X Primary Examiner—Robert J. Hickey
Attorney, Agent, or Firm—James E. Denny; Frank H. Jackson; Hugh W. Glenn

[57] ABSTRACT

A battery charging system capable of equalizing the charge of each individual cell at a selected full charge voltage includes means for regulating charger current to first increase current at a constant rate until a bulk charging level is achieved or until any cell reaches a safe reference voltage. A system controller then begins to decrease the charging rate as long as any cell exceeds the reference voltage until an equalization current level is reached. At this point, the system controller activates a plurality of shunt modules to permit shunting of current around any cell having a voltage exceeding the reference voltage. Leads extending between the battery of cells and shunt modules are time shared to permit alternate shunting of current and voltage monitoring without the voltage drop caused by the shunt current. After each cell has at one time exceeded the reference voltage, the charging current is terminated.

12 Claims, 8 Drawing Figures

| MODE | FUNCTION |
|---|---|
| A | START |
| B | BULK CHARGE |
| C | TAPER CHARGE |
| D | EQUALIZATION |
| E | STANDBY |

FIG. 5d ns include cells with aqueous electrolyte.
SYSTEM AND METHOD FOR CHARGING ELECTROCHEMICAL CELLS IN SERIES

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to battery chargers and methods of charging batteries of electrochemical cells. The invention is particularly well adapted to the new generation of batteries that are characterized by high storage capacity and power for unit weight. The individual cells are often the high-temperature, type without aqueous electrolyte that may be damaged if charged at too high a voltage. In such cells the structural components may enter into undesired electrochemical and corrosive reactions at voltages above the fullcharge voltages.

These high-temperature cells employ calcogens and metal chalcogenides including such as sulfur, iron sulfide, copper sulfide, cobalt sulfide and nickel sulfide as positive electrode materials and alkali metals, alkaline earth metals and alloys of these metals including such as sodium, lithium, lithium-aluminum, lithium-silicon, calcium, calcium-aluminum, calcium-magnesium, calcium-silicon as the negative electrode materials. Nonaqueous electrolytes including molten salts and porous oxides typically are used.

However, it will be understood that the present invention has application to any battery of cells in which it is desired to equalize charge at a set voltage level in the individual cells. This equalization of charge and voltage is of particular advantage in those cells employing nonaqueous and other electrolytes which do not provide the overcharge protection afforded by the electrolysis of water to form hydrogen gas.

Battery chargers for electrochemical cells that do not have inherent overcharge protection require close control of the charging voltage to prevent electrochemical degradation of the structural components within the individual cell. For example, in a cell using FeS as positive electrode material and iron or iron-base alloys in the current collector, the upper voltage level that can be applied to an individual cell without electrolytic degradation is about 1.6 volts. The open circuit voltage at full charge for the LiAl/FeS cell is about 1.3 volts but at least a small additional voltage must be available for providing the charging current. For the LiAl/FeS$_2$ cell with molybdenum current collector, the corresponding voltages are about 2.1 and about 1.8 volts. Charge voltages must be controlled within these narrow ranges to permit full charge to each cell without an electrochemical attack by the electrolyte onto the cell structural components. It will be clear that with other electrochemical cell systems and other structural or current collector materials, the permissible voltage range may differ from these examples.

Batteries of these type cells will involve a plurality of series-connected cells possibly in parallel banks to obtain desired operating voltage and current levels for external loads. Traditional recharging methods of applying a constant voltage across the battery of cells or regulating the current flow through the battery can result in excessive voltage on some individual cells before others are fully charged. Cells near and above the fully charged state may be subjected to voltage levels that result in electrochemical degradation.

In other cells using aqueous electrolyte, overcharge protection is often afforded by the electrolysis of water to form hydrogen gas. Although this reaction protects such batteries including the conventional lead-acid batteries from damage resulting from overcharging, it involves a waste of electrical energy, increased terminal corrosion and the danger of hydrogen gas emission. Therefore the battery charger and method described herein can be advantageously used to recharge battery systems including cells with aqueous electrolyte.

PRIOR ART STATEMENT

U.S. Pat. No. 4,079,303, Mar. 14, 1978, to Cox, "Charging System and Method for Multicell Storage Batteries", discloses a system in which high-temperature batteries of cells with molten electrolytic salt as electrolyte can be safely charged. In this system charging begins at a high but safe rate determined by the worst possible condition of the battery of cells. The charging rate is decreased stepwise in response to the total voltage or average cell voltage, across the battery of cells. When a predetermined charging current is obtained, the system shifts to an equalization charging mode in which controlled and equal charge voltage is applied to each individual cell within the series of electrochemical cells. This equalization procedure brings each individual cell to the same full charge condition without exceeding voltage limits that would result in electrochemical degradation.

This system has the disadvantage of relying on average cell voltages rather than a measurement of individual cell voltages. Consequently, very conservative assumptions must be employed in the system operation to avoid actual damage to individual cells. This conservative operation may unnecessarily extend the required charging time.

U.S. Pat. No. 4,006,034, Feb. 1, 1977, to Shimotake et al., "Method of Preparing an Electrochemical Cell in Uncharged State", discloses electrochemical cells that employ molten salts as electrolyte, metal sulfides as positive electrode material and lithium-aluminum alloy as negative electrode material. No battery charging systems are disclosed in this patent.

SUMMARY OF THE INVENTION

It is an object of the present invention to provide an improved battery charging system for charging and equalizing individual cells within a plurality of series-connected cells.

It is a further object to provide a battery charging system in which individual cell voltages can be monitored and controlled to avoid electrochemical degradation of cell components.

It is also an object to provide a method of charging a plurality of series-connected cells in which equalization of individual cells can be performed while minimizing the number of electrical leads required for monitoring and control functions.

In accordance with the present invention a battery charger is provided for charging and equalizing a plurality of series connected cells. The charger includes a source of direct current, voltage-monitoring components for comparing the voltage of each cell with a safe reference voltage, a controller for selecting and to some extent providing the mode of cell voltage control and shunt modules for bypassing current around the more fully charged cells during an equalization mode of operation. The controller initially activates circuitry for regulating charging current up to a first current level for bulk charging and then down to a second current level for cell equalization in response to voltage status of "below" or "not below" the reference voltage.

The controller increases the current through the series of cells during the initial periods of charging until the bulk charging level is achieved. Should any cell reach its reference voltage during this mode of operation or during charging at the bulk rate, the controller immediately begins to reduce charging current until each cell is below its reference voltage or until the equalization current level is achieved. When the equalization current level is reached, the controller signals the individual shunt modules that current may be bypassed through shunting transistors around individual cells having voltages exceeding reference voltage.

In more specific aspects of the invention, several separate modes of operation are established by the controller including an initial interval of increasing charge current, a bulk charging interval at a constant charge current, a tapering charge interval at a decreasing current level, and an equalization charging mode in which current is shunted around individual cells that have reached the reference voltage. In addition, the controller establishes alternate intervals of current shunting and voltage monitoring to permit use of the same leads for these purposes.

DETAILED DESCRIPTION OF THE DRAWINGS

DETAILED DESCRIPTION OF THE PREFERRED EMBODIMENT

Figure 1:
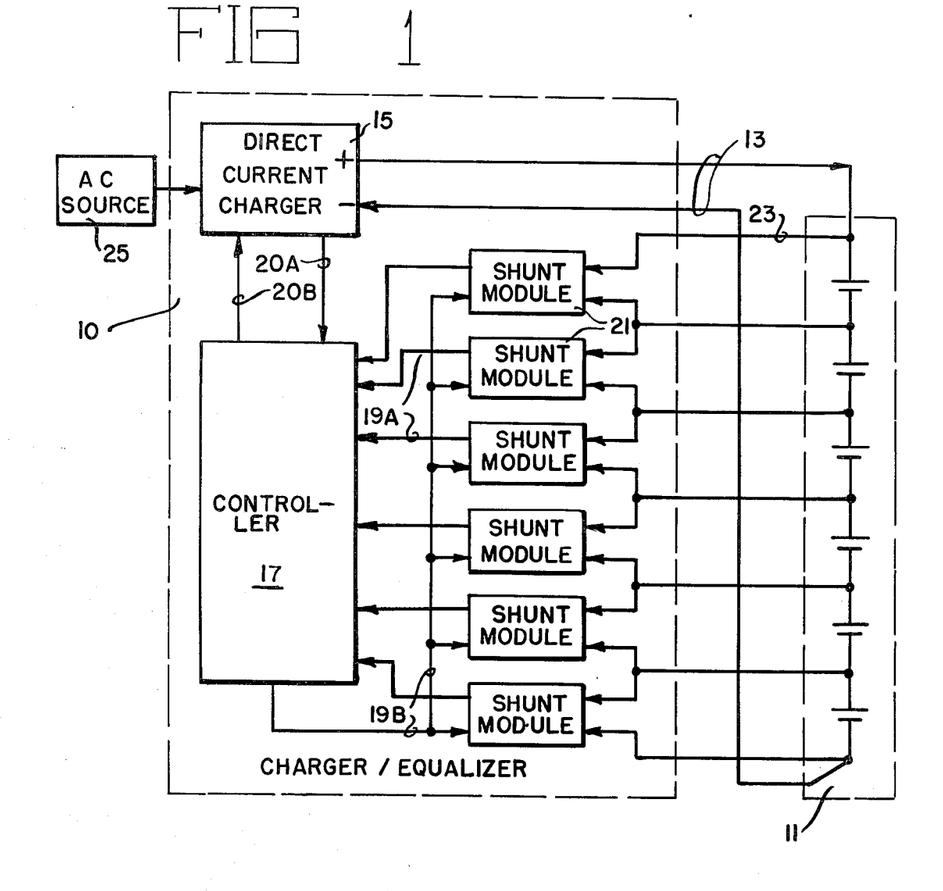
FIG. 1 is a generalized schematic diagram of a battery charging system.

In FIG. 1, a battery charger and equalizer 10 is illustrated, connected to a battery 11 of series-connected cells. Leads 13 from opposite battery terminals connect to a direct current charger 15 within the charger-equalizer 10 for carrying the charge current ($i_B$). A controller 17 is shown coupled to the charger 15 by leads 20a and 20b for monitoring and controlling current levels.

A plurality of shunt modules 21, one for each cell in the battery of cells, are suitably coupled to the controller 17 to transmit voltage status and control signals between these components through leads 19A and 19B. Each shunt module is connected in parallel across an individual cell in the battery of cells by leads 23 as shown.

It can be seen from FIG. 1 that the number of leads 23 and 13 between the battery 11 and the charger equalizer 10 is equal to three plus the total number of cells in series. This is the minimum number of leads that can be employed while using the present charging system and method. A few additional leads might also be employed for various monitoring purposes. However, in most instances less than two leads for each series-connected cell can be achieved. This is in contrast to other current shunting designs that require separate leads for cell voltage monitoring and for current shunting.

The battery charger and equalizer 10 can be used for recharging electric vehicle batteries, batteries used for power storage during off-peak energy consumption periods, and batteries of secondary electrochemical cells used for various other purposes. In electric vehicle use it is desirable that the light-weight components such as the shunt modules and the controller be carried on the vehicle. The direct current charger 15 may include voltage transformers or coils that would add significant weight such that it may be desirable to include it in central charging stations. However, in instances where the complete charger-equalizer 10 can be carried on the vehicle, an ordinary A.C. source 25 of, for instance, 110 or 220 volts may be employed for vehicle battery recharge.

The charger-equalizer 10 illustrated in FIG. 1 operates to charge the battery 11 of series-connected cells to an equalized fully charged state without exceeding the limiting voltage at which electrochemical degradation begins to occur in any individual cell. This is accomplished by first controlling the battery charge current ($i_B$) in leads 13 to insure that a maximum current level for bulk charging is not exceeded and to prevent any cell voltage from exceeding a safe level. In performing this latter function, the cell voltage of each individual cell is repetitively compared with a safe reference voltage transmitted through leads 23 to the shunt modules 21. Should any cell exceed that reference voltage, controller 17 begins to decrease the output control signal on leads 20B to the direct current charger 15 instructing it to reduce the charge current at a rate regulated by controller 17.

The safe reference voltage is selected at a sufficiently low level to permit small overruns without damage to the cell components. It must be above the open circuit voltage at full charge but below a voltage at which significant electrolytic degradation occurs. For example, a reference voltage between 1.3 to 1.6 volts can be selected for a LiAl/FeS cell including an iron current collector.

After the charge current in leads 13 reaches a minimum charge level, which will be referred to as the equalization charge rate, controller 17 signals each of the shunt modules to begin shunting current around any cell having a voltage that is not below the reference voltage. This process is continually monitored and accomplished through the time-sharing of leads 23 between the voltage-monitoring and current-shunting functions as signaled by controller 17.

Figure 2:
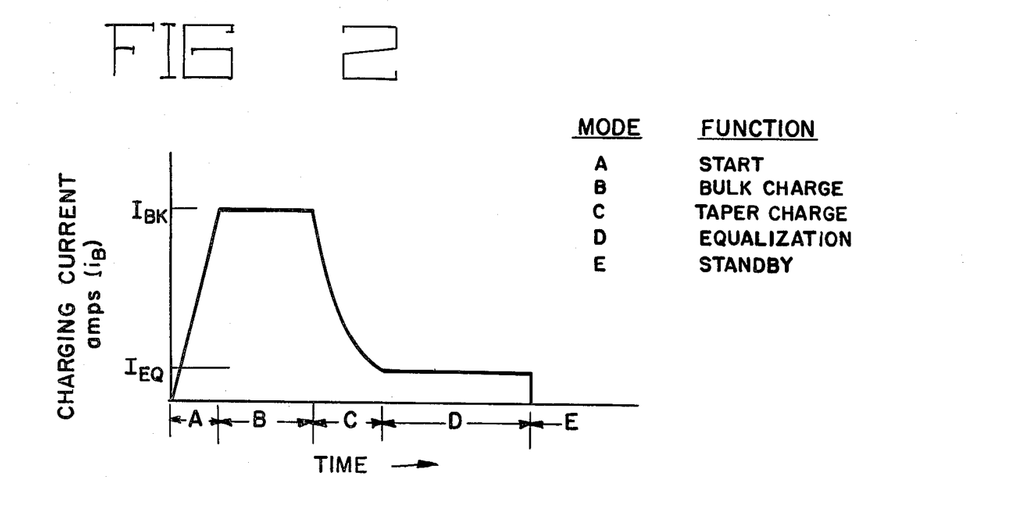
FIG. 2 is a graph of charging current (iB) versus time illustrating several modes of charging operation.

In FIG. 2 the various modes of charging performed by the battery charging system are illustrated. The graph of FIG. 2 illustrates charging current (iB) as a function of time for a complete charging cycle. In the first charging mode designated A, the current is increased at a constant rate until a maximum current selected as a bulk charging rate (IBK) is obtained. Should any electrochemical cell reach the reference voltage programmed into each of the shunt modules 21, the start mode A is immediately terminated at a lower charging current. Otherwise bulk charging at current IBK is continued in mode B operation until a cell reaches the reference voltage. Then in mode C designated taper charge, the charge rate is decreased when any cell reaches the reference voltage.

The taper charge interval C continues until the current level for cell equalization (IEQ) is reached. This constant equalization current is passed through battery 11 for mode D to bring each cell up to its reference voltage. During mode D, current is shunted through the shunt modules around any cell that reaches the reference voltage. After each cell has reached the reference voltage during mode D, the charge current is terminated or substantially reduced to a trickle level as illustrated by standby mode E.

The several modes of operation during the charger cycle are illustrated as a typical application of the present invention. It will, of course, be clear that in certain circumstances various modes of operation may be omitted. For example, if it is clear that the bulk charging rate will not immediately cause any individual cell to exceed reference voltage, the starting mode A may be omitted and the bulk charging rate immediately begun. Conversely, where the bulk charging rate is set at a high level or certain cells are not deeply discharged, the charging cycle may move immediately from the starting mode A to the taper charge C when a cell reaches the reference voltage.

Figure 3:
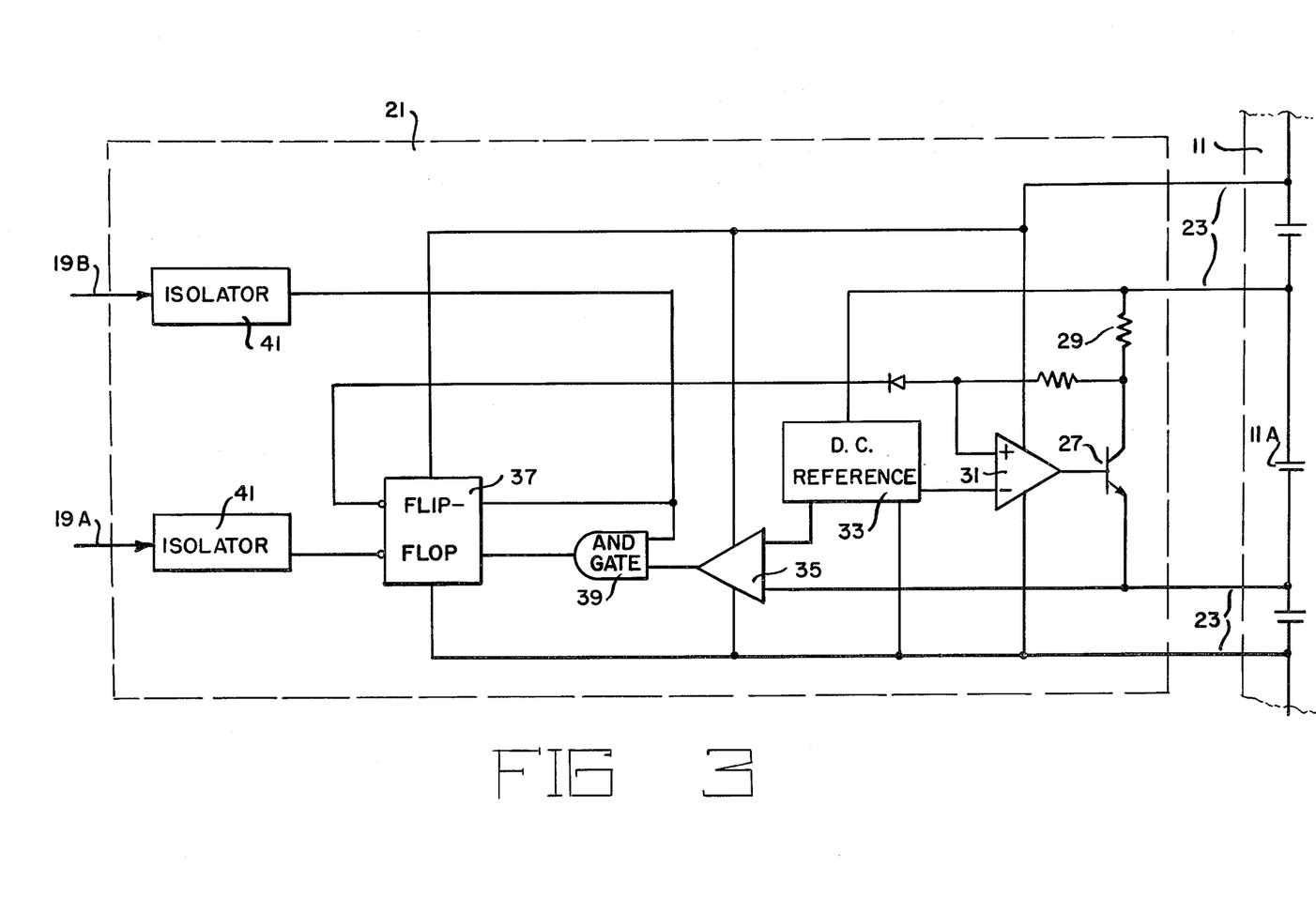
FIG. 3 is a more detailed schematic diagram of the shunt modules illustrated in FIG. 1.

In the schematic of FIG. 3, the shunt module 21 is illustrated in more detail. Each individual cell 11A of battery 11 of series-connected cells is connected by means of leads 23 to a current bypass such as shunting transistor 27 and resistor 29. Transistor 27 is turned on and off by the output of amplifier 31 which is used to regulate the shunt current voltage generated across resistor 29 with a preprogrammed reference voltage from source 33. Shunting can occur only when the detected cell voltage has reached the reference voltage and when a "shunt" signal is transmitted via lead 19B from controller 17, i.e. when the charger is operating in the equalization mode D.

Reference voltage source 33 is compared with the individual cell voltage 11A during the earlier charging modes A, B and C to provide closed-loop control of the battery charging current iB. If any cell in the battery 11 reaches or exceeds the reference voltage, detector amplifier 35 gives an output which is latched into flip-flop 37. Gate 39 insures that flip-flop 37 is operated only when a "monitor" signal is received along lead 19B. This prevents operation of flip-flop 37 during shunting as will be discussed below. This output from amplifier 35 provides a signal through lead 19A to the system controller 17, indicating that a particular cell has reached its reference voltage. In response to such a signal, the taper charge mode C is begun.

The signals to and from the shunt module 21 along leads 19A and 19B pass through isolators 41 to permit the controller and shunt module to be operated at different voltage levels. Any suitable isolators such as optic devices or transformers can be used in this application.

Power voltage for amplifiers 31 and 35 within the shunt modules are conveniently provided from adjacent cells in the plurality of series-connected cells at battery 11. Leads 23 that are also employed for sampling cell voltage and shunting current can also be used for providing power to these control components. Notwithstanding the variation in voltage level due to the change in cell voltage between the discharged and charged states, the inventors have found that a subseries of cells in the battery of cells being charged provide an adequate source of control power for control components within individual shunt modules 21. Although only three series-connected cells are shown for this purpose, it will be clear that any number of series-connected cells may be included in this subseries.

Figure 4:
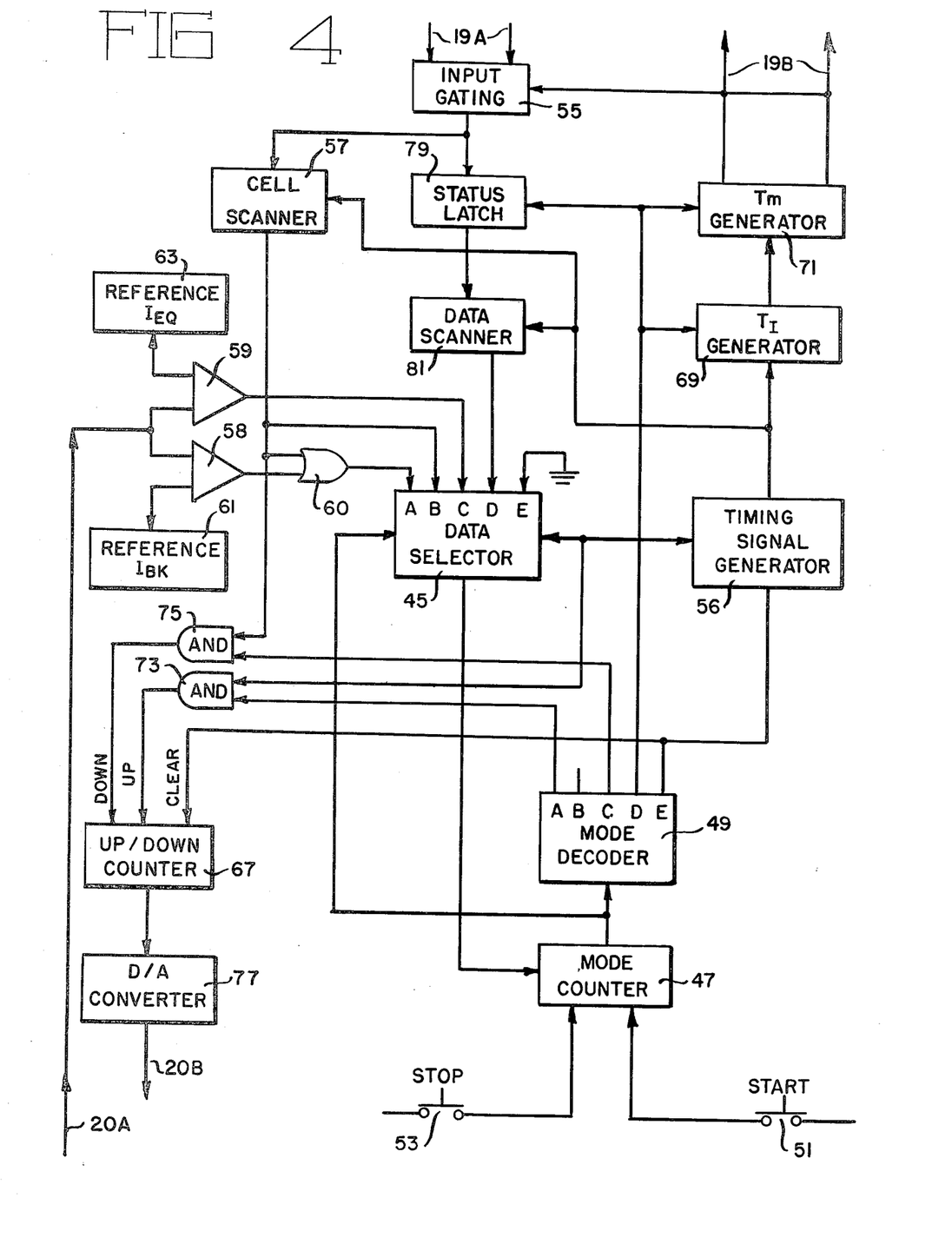
FIG. 4 is a more detailed schematic diagram of the controller shown in FIG. 1.

In FIG. 4, the system controller 17 is illustrated diagrammatically in more detail. Included is suitable circuitry for selecting and activating each of the previously described operating modes designated A-start, B-bulk charge, C-taper charge, D-equalization and E-standby. Data selector 45 includes these five input channels for providing an "advance" signal to mode counter 47 which, in turn, advances both the data selector and the mode decoder 49. Appropriate start and stop switches 51 and 53 are provided to reset these mode selector components 45, 47 and 49 to modes A or E as desired. In turn, signals to inputs A, B, C, etc. of the data selector 45 generate an output to mode counter 47 which advances both the data selector 45 and the mode decoder 49. The mode decoder 49 provides appropriate outputs through the remainder of the controller to institute the appropriate mode of operation.

Input signals from the various shunt modules enter input gating 55 in leads 19A, indicating the cell voltage status of the individual cells, that is, whether or not a cell is below its reference voltage level. These inputs are continuously scanned with the cell status scanner 57 to provide an output to channels A and B of data selector 45 when the first cell reaches its reference voltage. As described, this will result in an advance to mode C, the taper charge.

Two current comparators 58 and 59 compare a signal representing the battery charge current in lead 20A with a reference current level for a bulk charge provided at 61 and the reference current level for equalization charge at 63. Should the charging current exceed the predetermined bulk charge level, comparator 58 provides an output through OR gate 60 to the data selector 45 which is advanced from mode A to the bulk charging mode. When the charging current falls to the equalization charge level, the data selector 45 and auxiliary circuitry 47 and 49 are advanced to mode D for charge equalization.

The system timing is provided by a signal generator 56 which provides outputs to an up/down counter 67 and two time interval generators 69 and 71. The timing signal to counter 67 passes through AND gate 73 to provide an up-count to the counter only if mode A is indicated from the mode decoder 49. Similarly, a down-count is received by counter 67 if AND gate 75 receives signals from both output C of mode decoder 49 and the cell status scanner 57. The output from counter 67 is changed to a current reference signal in the digital-to-analog converter 77 and transmitted to the direct current charger by leads 20B to permit control of the battery charge current. One other input to counter 67 can be received from mode E of the mode decoder 49 for resetting or clearing the counter to terminate or substantially reduce the charging current to a mere trickle.

The two time interval generators 69 and 71 are activated during the equalization, D mode of operation, to generate time intervals for voltage monitoring and for current shunting. The current-shunting interval is conveniently established as the difference between the time interval $T_I$ produced by a count in generator 69 and the time interval $T_m$ produced by generator 71. In effect, operation of the $T_m$ and $T_I$ generators initiates the current-shunting operation of the shunt modules. The $T_m$ generator 71 sets the duration of the voltage monitoring period of the shunt modules and the $T_I$ generator 69 sets the rate at which the voltage-monitoring periods occur.

During the D mode of operation, no further down signals are addressed to the up/down counter which remains fixed at the level corresponding to the cell equalization current. The output signal from the $T_m$ generator 71 disables the input gating 55 during the voltage monitoring interval to prevent detection of erroneous cell voltages resulting from transient conditions. The monitored voltage status is held within flip-flop 37 of the shunt module 21 and transmitted through to the controller 17 during the current-shunting interval. The signal indicating that any cell has reached its reference voltage is transmitted to both the cell status scanner 57 and the status latch 79. The status latch component includes a channel for each cell of the battery of cells capable of indicating whether or not a particular cell has at any time during charge equalization reached its reference voltage. The latch data scanner 81 continually monitors these channels in status latch 79 at the system timing frequency so as to signal data selector 45 when all of the cells have reached their reference voltage. This event established standby mode E within the battery charger.

The various components within the shunt module of FIG. 3 and the controller of FIG. 4 are all well-known components within the electronic art. The individual components such as up/down counter, signal generators, counters, data selectors and comparator amplifiers are all well known in the art and can be readily obtained commercially. For example, almost the entire controller 17 can be provided as a microprocessing circuit commercially available from Intel Corporation, specified as 8748. With such a unit, the digital-to-analog converter 77 and comparator amplifiers would need to be separately provided. Similarly, the comparator, amplifiers, flip-flops, oscillators, and shunting capacitors of the shunt modules are readily available from commercial sources. Present technology permits the fabrication of the shunt module circuitry into a single hybrid integrated circuit.

In one manner of operating the battery charger, closing the start switch resets the mode counter to mode A which initiates the charging cycle. Mode A operation starts an up-count pulse train from the timing signal generator 56 to the up/down counter 67. For example, a 10 Hz signal can be employed. The reset of the mode counter 47 returns the data selector 45 to channel A and initiates operation of the cell status scanner 57. The cell status scanner scans the cell voltage status signals at another rate established by the system timing generator 56, e.g. 100 Hz, during the A and B modes of operation to provide a signal if any cell reaches its reference voltage. The system timing generator 56 synchronizes the scanning of the cell status, advancement of the operating mode in the data selector 45 and incrementing of the up/down counter 67. As the count in the up/down counter 67 increases, the output current reference signal from the digital-to-analog converter increases. This causes the battery charger 15 to increase its current proportionally. The charge current in battery charger 15 is detected and compared with a preset bulk charge level in comparator 58. If the detected current is equal to or greater than the bulk charge level, comparator 58 advances the mode counter 49 through the data selector 45. It is thus seen that either a signal from cell status counter 57 or comparator 58 will advance the system from mode A to mode B. It should also be noted that the cell status scanner will promptly advance the system to mode C when any cell reaches its reference voltage.

In mode B, the count in the up/down counter remains constant at the bulk charge level. As soon as any cell reaches its reference voltage level, the cell status scanner 57 will transmit a signal to the data selector to advance the system to mode C. During mode C (taper charge), the down input of the up/down counter 67 is addressed by the cell status scanner 57 each time it detects that a cell has reached its reference voltage. The down pulse decreases the up/down counter which reduces the level of the current reference signal to the battery charger. When the detected charge current falls below the reference equalization current represented at 63, comparator amplifier 59 signals the data selector to advance the system to mode D (equalization). In mode D, the count in the up/down counter remains fixed at a count corresponding to the equalization current. The status latch 79 and time interval generators 69 and 71 are enabled to initiate the current-shunting operation of the cell shunt modules. Whenever a cell is found to have reached its reference voltage, a signal in that regard to the status latch 79 activates a memory element corresponding to that cell. When each of the memory elements within the status latch have indicated that the reference voltage for its cell has been reached, the latch status scanner 81 transmits a signal to the data selector 45 to advance the system into the E or standby mode.

FIGS. 5A through 5D illustrate various aspects of the charging operation during the cell equalization mode. During all other periods of charging, the system controller 17 holds the shunt modules in condition to continuously monitor cell voltage. During equalization the controller forces the shunt modules into the shunt condition for operation but periodically pulses the system back into the voltage-monitoring condition to accurately sense and store cell voltage status. This periodic sensing of the cell voltage and corresponding on/off operation of the shunt provides a time-modulated reduction in charge current to the individual cells during equalization. This operation is similar to current-limited constant-voltage charging where the current limit is the equalization current and the constant-voltage level is the reference voltage. The reduction of the average charge current to maintain constant cell voltage is achieved by the on/off operation of the individual cell shunt modules.

Figure 5A:
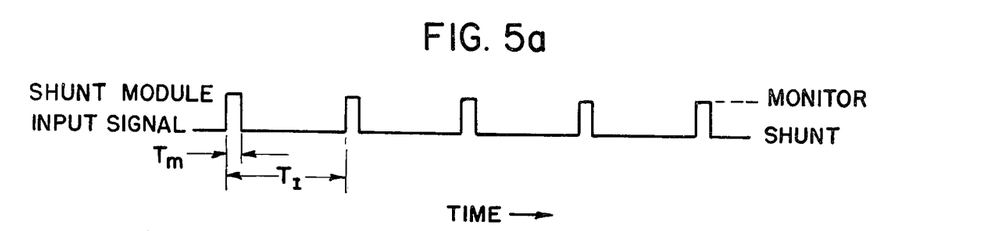
FIGS. 5a to 5d are a series of charts illustrating the relation between control signal, cell voltage, cell current and shunt current during cell equalization.

The wave form of FIG. 5A shows the system controller signal which forces the shunt module operation between the monitoring and shunt conditions. At time intervals $T_I$, all of the shunt modules are switched from the shunt condition into the monitoring condition for a short period of time $T_m$ to sense and store cell voltage status. During the cell voltage monitoring period, the shunt is disabled and the charge current from the main charger passes through the cell at the equalization rate. This allows sensing of cell voltage under charge conditions and eliminates voltage errors from IR drop in the leads. There is no need for separate voltage sense leads and current shunting leads when this system is used.

Figure 5B:
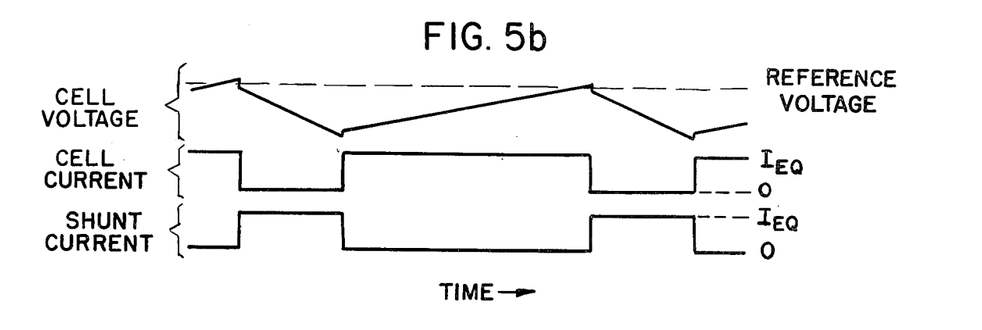
Figure 5C:
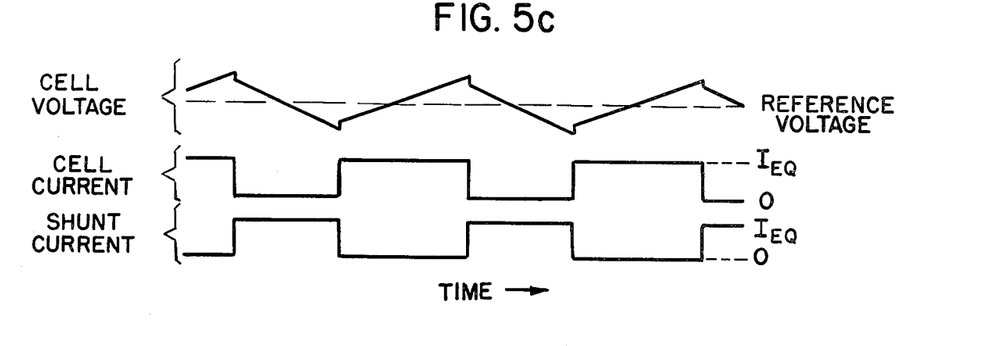
Figure 5D:
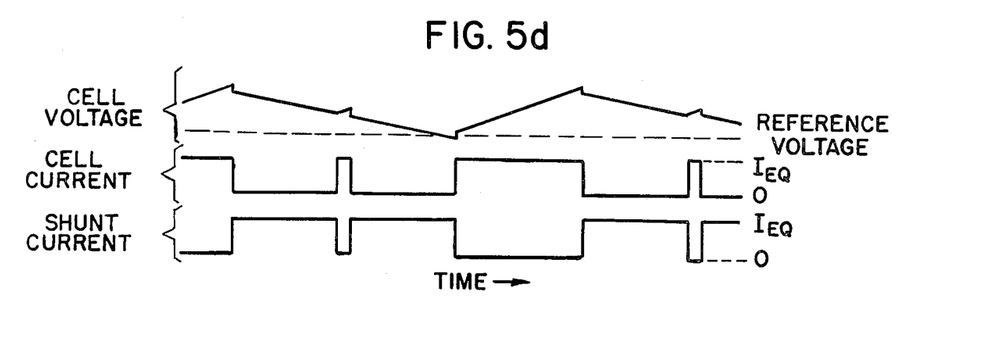

Wave forms of cell voltage, cell current and shunt current are shown for three different cell states of charge conditions in FIGS. 5B, 5C and 5D. When the cell voltage is detected at the reference level during the $T_m$ period, the current shunt is enabled for the remainder of the $T_I$ interval ($T_I-T_m$). A single interval of current shunting can cause a rapid decrease in cell voltage as is illustrated in the case of FIG. 5B. During the next voltage-monitoring period $T_m$, the cell voltage is detected as being less than the reference and the shunt current remains disabled. If the interval between cell voltage monitoring periods is short, e.g. 90–100 ms, a relatively linear change in cell voltage occurs. As shown in the case of FIG. 5B, several sensing periods can elapse before the cell voltage again reaches the reference level. In this example, current is shunted around the cell for one interval period out of every three and the average charge current that passes through the cell is about 0.7 of the equalization current.

In the case of FIG. 5C, which occurs later in the equalization period, the cell state of charge is increased such that the rise and fall in cell voltage occurs at about the same rate. This results in the shunting of current around the cell during every other period. The average charge current received by the cell is not about 0.55 of the equalization current.

In the case illustrated in FIG. 5D, the cell's state of charge is increased farther. In this condition, a single interval where the charge current passes through the cell causes a rapid rise in cell voltage. Several intervals are required for the cell voltage to decrease back below its reference level. In the FIG. 5D example, the average cell charge current is about 0.4 times the equalization current.

It can thus be seen that the shunt module is reducing the average charge current by taking time slices out of the equalization charge. The number and frequency of time slices (time modulation) is dictated by the response of the cell voltage. To the individual cells of the battery, the time average operation of the shunt module is equivalent to current-limited constant-voltage equalization charging.

Since the shunt module senses cell voltage under charge conditions, there is a minimum level to which the average charge current can be reduced if the shunt current equals the equalized current. This minimum level is the fraction of the equalization charge rate corresponding to TM/TI. The minimum current is reached when cell voltage is continually detected above the reference voltage level.

If the shunt current is set slightly higher than the equalization current, average charge currents below this minimum level can be achieved. Appropriate shunt current levels can be selected to obtain an average minimum charge current at zero for a cell which never drops below the reference voltage. This technique, though slightly less energy efficient, provides excellent protection against overcharge during extended equalization periods.

As an example of typical operation of a charger, a battery of FeS/LiAl cells with LiCl/KCl electrolyte and iron current collector is considered. Each cell includes three parallel sets of positive and negative electrodes in a multiplate arrangement. A bulk charge current of 40 amps is used followed by an equalization current of 6 amps. The system timing is established by 10 Hz and 100 Hz frequencies to provide charging current increases or decreases, depending on the mode of operation and the cell voltage status, of 2 amps per second. It will be understood that each change in current may affect cell voltage status such that the average rate of current decrease in mode C is ordinarily not at such a high rate. The system timing also establishes typical voltage-monitoring intervals of 10 ms and current-shunting intervals of 90 ms at a 100 ms total time interval during the equalization mode of operation. Under these conditions, small voltage fluctuations of a few millivolts can be expected around a reference of about 1.55 volts. The highest voltage excursions are thus well below the limit of 1.6 volts at which electrolytic degradation is believed to begin in the cell of this example.

It is therefore seen that the present invention provides a battery charging system that can be used to raise the charging rate to a relatively high bulk rate and continue there as long as no cell exceeds a safe voltage limit. The charging rate is then reduced gradually as required to attend closed-loop current control at a safe cell voltage level until the equalization charging rate is obtained. Charging at the equalization rate is continued by shunting current around individual cells that have the desired voltage level. When all of the cells reach that level, the charging is terminated or reduced to an innocuous trickle level to offset cell discharge.

Although the present invention is described in terms of specific embodiments, it should be clear that various modifications in the components, materials and techniques can be employed by those skilled in the art in accordance with the invention defined in the claims.

The embodiments of the invention in which an exclusive property or privilege is claimed are defined as follows:

1. A battery charger for charging a plurality of series-connected cells comprising:
   a D.C. source for passing a regulated current between predetermined first and second current levels through said series of cells, said first current level being in excess of said second current level;
   voltage-monitoring means for comparing the voltage of each cell with a reference voltage and for generating an output indicating the status of each cell as below or not below said reference voltage;
   current-regulating means coupled to receive the output of said voltage-monitoring means and to generate an output to said D.C. source for current regulation in response to cell voltage status, said current-regulating means operating to increase current as long as each cell voltage remains below the reference voltage but only to said first current level and to decrease current when any cell voltage rises to the reference voltage but only to said second current level;
   shunt module means electrically coupled to each of said cells, to said current-regulating means and to said voltage-monitoring means for shunting current around any cell having a voltage not below the reference voltage but only when the regulated current has decreased to the second current level; and
   control means for selecting a mode of controlling cell voltage by initially activating said current-regulating means and subsequently activating said shunt module means when said regulated current is decreased to said second current level.

2. The battery charger of claim 1 wherein said control means including time-interval generating means coupled to said shunt module means for providing a series of equally spaced signals that eliminate current shunting and thereby generate a series of voltage-monitoring periods separated by current-shunting periods.

3. The battery charger of claim 1 wherein said control means includes a timing signal generator providing a signal of a first frequency and counter means for receiving said first signal in either an up or a down address for increasing or decreasing charging current, said timing signal generator further providing an output signal of a second frequency in excess of several multiples of said first frequency coupled to time interval generators for providing a combined train of first and second time intervals to said shunt module means for generating periods of voltage monitoring separated by periods of current shunting.

4. The battery charger of claim 1 wherein said current- regulating means includes means for decreasing current through said series-connected cells in response to voltage status signals indicating any cell voltage not below said reference voltage and for maintaining current constant in response to signals indicating all cell voltages below said reference voltage after current reduction begins.

5. The battery charger of claim 1 wherein said shunt module means includes a plurality of shunt modules each coupled to an individual cell, each of said corresponding shunt module is also coupled across at least three cells in the plurality of series-connected cells for providing a potential difference for voltage monitoring and shunt switching.

6. The battery charger of claim 1 wherein said control means includes means for storing cell voltage status when any cell rises to the reference voltage and for providing an output to the D.C. source for terminating current through the plurality of series-connected cells when all cells have risen to the reference voltage.

7. A method of charging a plurality of series-connected cells by passing an electric current through the series of cells comprising:
   comparing the voltage across each cell in the series of cells with a reference voltage;
   increasing current through the series of cells until a first current level is reached or until any cell voltage reaches the reference voltage;
   decreasing current through the series of cells when any cell voltage reaches the reference voltage until a second current level is reached; and
   shunting current around each cell having a voltage not below said reference voltage while maintaining said second current level through said series of cells.

8. The method of claim 7 wherein the event of a cell voltage reaching the reference voltage at the second current level is stored and continuously scanned, said second current level is terminated when each cell voltage has at one time reached the reference voltage while charging at the second current level.

9. The method of claim 7 wherein timing signals are produced and counted for determining the rate of increase and decrease between said charging current levels.

10. The method of claim 7 wherein the charging current is increased through the series of cells at a constant rate until the first current level is reached or until one of said cells reaches the reference voltage level, charging at said first current level until any cell voltage reaches the reference voltage, decreasing charging current at a constant rate as long as any cell voltage is at or above the reference voltage but without current change when each cell voltage is below the reference voltage until the second current level is achieved, shunting current around any cell having a voltage at or above the reference voltage while passing current at the second level through any cell having a voltage below the reference voltage and terminating the charging current when the voltage of each cell has at one time reached the reference voltage at the second current level.

11. The method of claim 7 wherein said shunting of current being permitted during a series of repetitive shunting intervals interrupted by a series of repetitive voltage-monitoring intervals in which the voltage status of below or not below reference voltage for each cell is determined, current at the second level passing through each cell during said voltage-monitoring intervals and during said current-shunting intervals through only those cells having voltages below said reference voltage.

12. The method of claim 11 wherein cell voltage status is stored during said voltage-monitoring and current-shunting intervals to permit scanning of cell voltage status during said current-shunting interval.

* * * * *